(12) United States Patent
Takahashi

(10) Patent No.: US 7,868,516 B2
(45) Date of Patent: Jan. 11, 2011

(54) ELECTROSTATIC ACTUATOR HAVING ELECTRODES WITH DEFORMATION PATTERNS HAVING LARGER PITCHES FROM THE CENTER

(75) Inventor: Isao Takahashi, Tokyo (JP)

(73) Assignee: Alps Electric Co., Ltd., Tokyo (JP)

( * ) Notice: Subject to any disclaimer, the term of this patent is extended or adjusted under 35 U.S.C. 154(b) by 177 days.

(21) Appl. No.: 12/273,074

(22) Filed: Nov. 18, 2008

(65) Prior Publication Data

US 2009/0079296 A1 Mar. 26, 2009

(51) Int. Cl.
*H02N 1/00* (2006.01)

(52) U.S. Cl. ..................................... 310/309
(58) Field of Classification Search .................. 310/309
See application file for complete search history.

(56) References Cited

U.S. PATENT DOCUMENTS

| | | | | |
|---|---|---|---|---|
| 5,055,731 A | * | 10/1991 | Nihei et al. | 310/309 |
| 5,448,124 A | * | 9/1995 | Higuchi et al. | 310/309 |
| 5,461,272 A | * | 10/1995 | Matsumoto | 310/309 |
| 5,523,639 A | * | 6/1996 | Okamoto et al. | 310/309 |
| 5,541,465 A | * | 7/1996 | Higuchi et al. | 310/309 |
| 5,869,916 A | * | 2/1999 | Suzuki et al. | 310/309 |
| 6,472,795 B2 | * | 10/2002 | Hirose et al. | 310/309 |
| 6,525,446 B1 | * | 2/2003 | Yasuda et al. | 310/309 |
| 6,563,249 B1 | * | 5/2003 | Jung et al. | 310/309 |
| 7,091,648 B2 | * | 8/2006 | Gondoh | 310/309 |
| 7,192,202 B2 | * | 3/2007 | Matsuki et al. | 396/358 |
| 7,304,410 B2 | * | 12/2007 | Odaka et al. | 310/309 |
| 2009/0079296 A1 | * | 3/2009 | Takahashi | 310/300 |

FOREIGN PATENT DOCUMENTS

| | | | |
|---|---|---|---|
| JP | 04-172973 | * | 6/1992 |
| JP | 04-271284 | * | 9/1992 |
| JP | 09-233858 | * | 9/1997 |
| JP | 2003-309666 | * | 11/2003 |
| JP | 2005-019981 | | 1/2005 |
| WO | 2005/050266 A1 | | 10/2004 |

OTHER PUBLICATIONS

Manual Translation of 04-271284, "electrostatic actuator", Nishiguchi Noboru et al., Sep. 28, 1992.*

* cited by examiner

*Primary Examiner*—Karl I Tamai
(74) *Attorney, Agent, or Firm*—Brinks Hofer Gilson & Lione

(57) ABSTRACT

When a mover during moving is displaced in a direction (X2 direction) perpendicular to a moving direction, between a deformation pattern portion formed in stator-side electrodes of a stator and a deformation pattern portion formed in mover-side electrodes of the mover, a restoring force trying to return the mover toward a direction (X1 direction) opposite to the X2 direction acts on the mover. This makes it possible to prevent the mover from displacement, and consequently to provide an electrostatic actuator improved in the linear movability toward the moving direction.

5 Claims, 15 Drawing Sheets

FIG. 3
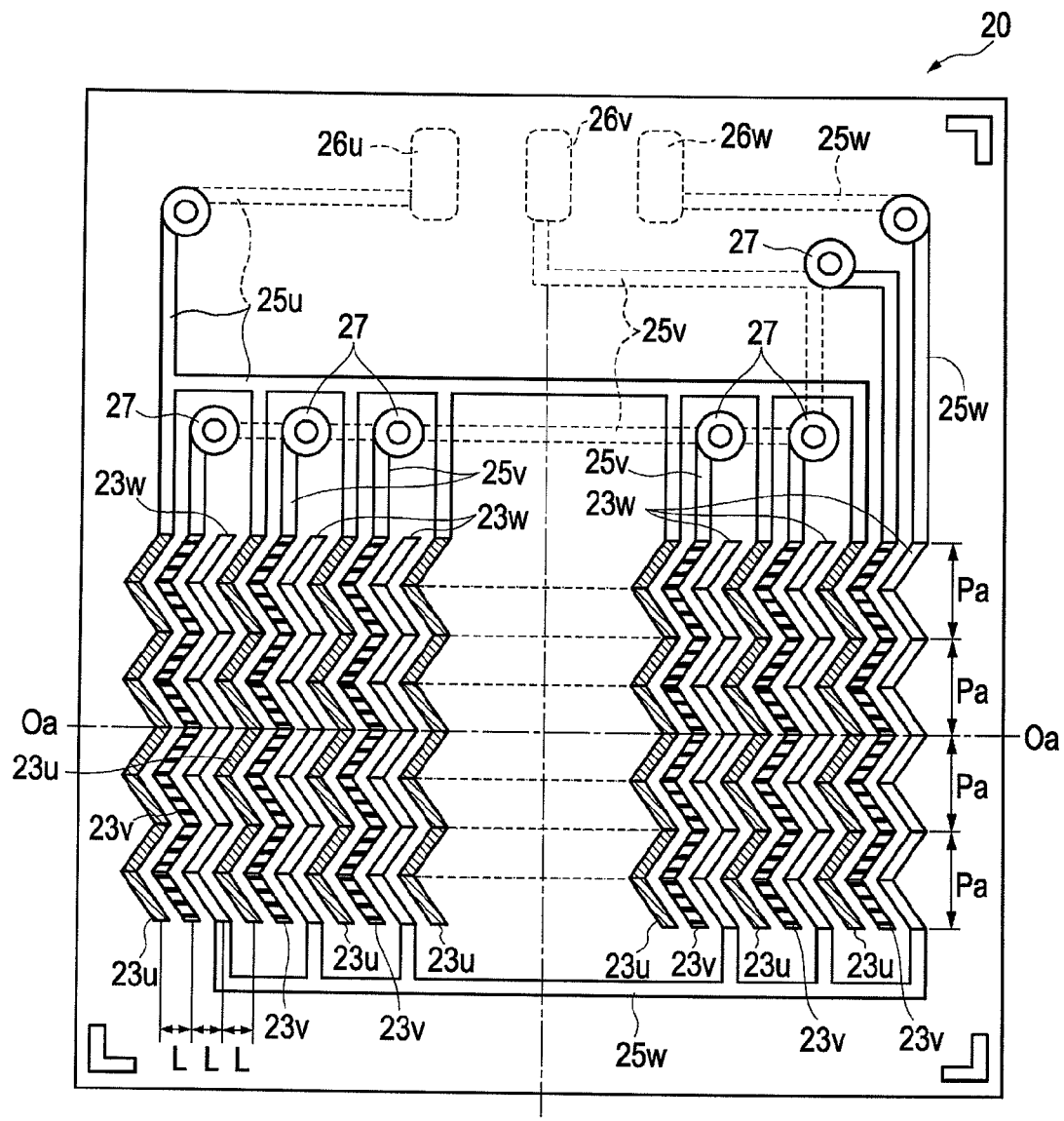
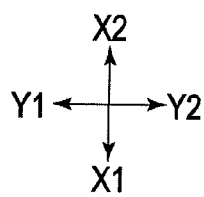

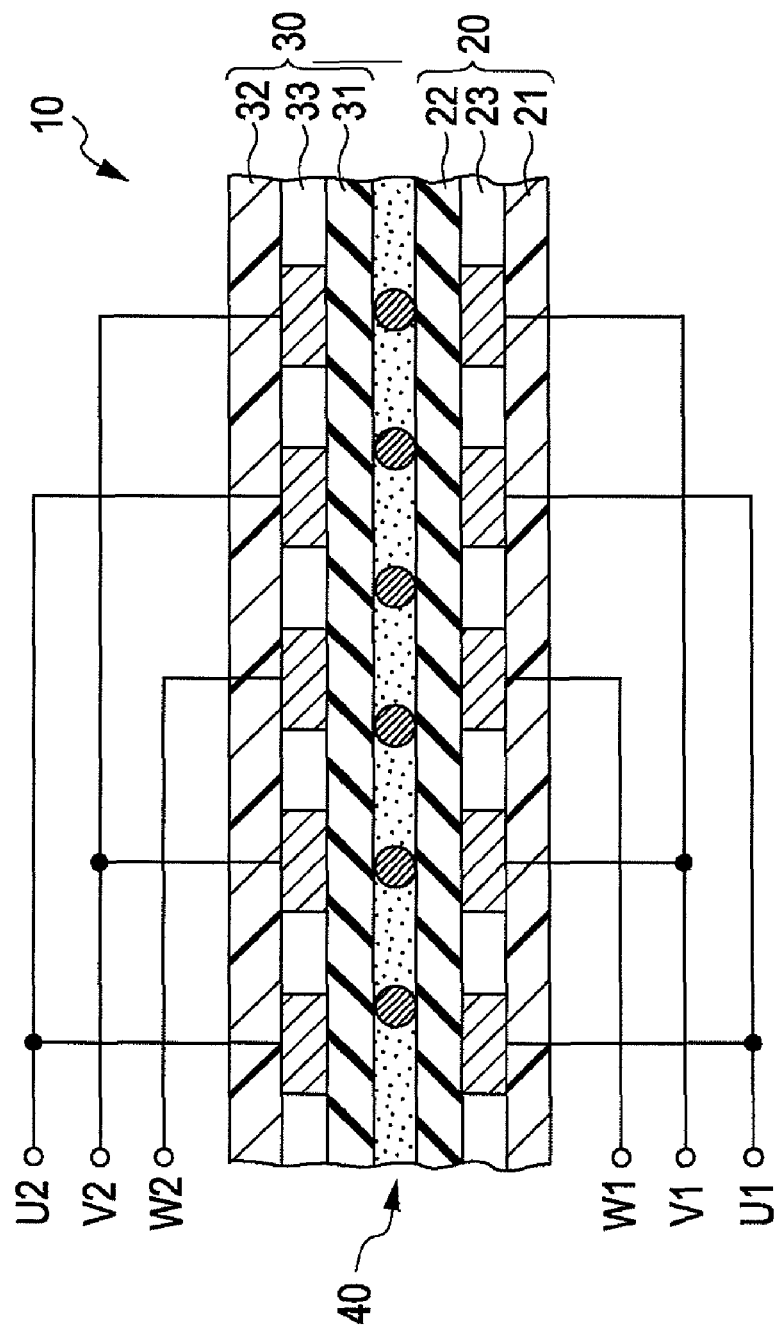

SINE WAVES

THREE-PHASE
STEP WAVES

TYPICAL THREE-PHASE
STEP WAVES

THREE-PHASE
PSEUDO SINE WAVES

LETTING $f1 = f2 = f$,
$Fy = (f1+f2)\cos\theta = 2f\cos\theta$
$Fx = f1\sin\theta - f2\sin\theta = 0$

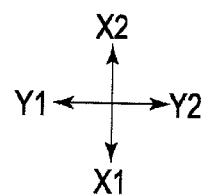

ELECTROSTATIC ACTUATOR HAVING ELECTRODES WITH DEFORMATION PATTERNS HAVING LARGER PITCHES FROM THE CENTER

CLAIM OF PRIORITY

This application claims benefit of the Japanese Patent Application No. 2006-139320 filed on May 18, 2006, which is hereby incorporated by reference.

BACKGROUND OF THE INVENTION

1. Field of the Invention

The present invention relates to parallel plate electrostatic actuator using thin films, and more specifically, to an electrostatic actuator improved in the linear movability toward a moving direction.

2. Description of the Related Art

Japanese Unexamined Patent Application Publication No. 09-233858) discloses an electrostatic actuator improved in controllability by reducing fluctuations in thrust due to the positional relationship between a mover and a stator by arranging the mover and the stator with a specified inclination (skew) provided, as illustrated in FIGS. 5 and 6 in this patent document.

Furthermore, Japanese Unexamined Patent Application Publication No. 2001-162599 discloses a rotational actuator having a mover and a stator with electrodes arranged in a zigzag manner.

Generally, in the electrostatic actuator, it is required not only that the mover can move, but also that the mover can move straight toward a moving direction with respect to the stator. In other words, the electrostatic actuator is required to have a high linear movability during moving.

However, due to a slight unevenness of an opposing gap between the stator and the mover, a stronger force operates in the narrower gap portion, while a weaker force operates in the wider gap portion. On the other hand, if the mover receives some external force, a force that displaces the mover toward its widthwise direction acts on the mover. Because such forces operate in an oblique direction relative to a traveling direction, there occurs a possibility that the mover may assume an inclined posture, resulting in an inoperative state.

Therefore, there is a need to install guide means for preventing the mover from the inclining. However, this causes problems such as a loss of thrust owing to a sliding resistance generated by the guide means, and the complication of the structure and the increase in assembly procedures due to the installation of the guide means.

In regard to this point, the actuator disclosed in the Japanese Unexamined Patent Application Publication No. 09-233858 sets forth the reduction in fluctuations of thrust, but does not refer to the linear movability during moving at all.

On the other hand, since the actuator disclosed in Japanese Unexamined Patent Application Publication No. 2001-162599 is a rotational actuator, the linear movability during moving constitutes no problem. Therefore, in this patent document, although a way of obtaining a maximum rotational driving force by arranging electrodes in a zigzag manner is described, a technique for enhancing the linear movability is not referred to at all.

SUMMARY OF THE INVENTION

In order to solve the above-described problems, the present invention provides an electrostatic actuator improved in the linear movability toward the moving direction.

The present invention includes: a stator having a plurality of stator-side electrodes; a mover having a plurality of mover-side electrodes; and a drive signal generating portion supplying predetermined drive signals between the stator-side electrodes and the mover-side electrodes, wherein the mover is moved toward a predetermined moving direction in a state of being opposed to the stator, wherein, when a direction perpendicular to the moving direction is defined to be a widthwise direction, the stator-side electrodes and the mover-side electrodes are formed into a linear pattern or a band shaped pattern along the widthwise direction; and both the stator-side electrodes and the mover-side electrodes have deformation patterns of a wavy shape or a mountain-and-valley shape at least in their portions; and wherein in the stator-side electrodes and the mover-side electrodes, the deformation patterns are provided at a plurality of places along the widthwise direction; and a pitch dimension between deformation patterns mutually adjacent in the widthwise direction is formed larger at places away from a center line on the stator side and a center line on the mover side than at places nearer the center lines, and wherein the stator-side electrodes and the mover-side electrodes are formed into the same pattern shape.

In the present invention, the deformation pattern portion that ordinarily generates thrust can generate a restoring force that corrects a displacement when a displacement has occurred. This allows enhancement of a linear movability during moving.

Furthermore, since the electrostatic actuator according to the present invention has the restoring force with respect to the displacement, it is possible to drive the mover without the need to install guide means. If specially a displacement in a rotational direction occurs, displacement amounts at both ends becomes large, but even in that case, it is possible to exercise the restoring force, thereby allowing an electrostatic actuator resistant to displacement to be provided.

In the electrostatic actuator according to the present invention, when an imaginary straight line extending toward the moving direction through a widthwise center of the stator is assumed to be a center line on the stator side, and an imaginary straight line extending toward the moving direction through a widthwise center of the mover is assumed to be a center line on the mover side, it is preferable that the stator-side electrodes be formed into shapes that are line-symmetric with respect to the center line on the stator side and that the mover-side electrodes be formed into shapes that are line-symmetric with respect to the center line on the mover side.

Furthermore, in the electrostatic actuator according to the present invention, it is preferable that the stator-side electrodes and the mover-side electrodes be both configured so that electrodes adjacent to each other along the moving direction are formed into the same pattern shape.

According to the above-described electrostatic actuator, a constant thrust can be provided to the mover in the course of moving. As a result, there is no need to repeat rapid acceleration or rapid deceleration with respect to the mover during moving. This allows an electrostatic actuator of which the mover is less prone to be displaced to be provided.

In the electrostatic actuator according to the present invention, at least the mover is preferably formed into a thin sheet shape.

According to the above-described electrostatic actuator, the mover can be reduced in weight. This allows an electrostatic actuator that is high in responsiveness and low in power consumption to be achieved.

For example, the electrostatic actuator in the present invention may be configured so that drive signals having a three-phase alternating current shape is supplied between the stator-side electrodes and the mover-side electrodes, from the drive signal generating portion.

In the electrostatic actuator in the present invention, even if some external force acts on the electrostatic actuator and a displacement temporarily occurs, a self-correction operates during moving, thereby allowing the displacement to be canceled out.

Thus, it is possible to provide an electrostatic actuator improved in the linear movability toward the moving direction.

BRIEF DESCRIPTION OF THE DRAWINGS

FIG. 3 is a plan view showing a configuration of a stator according to a first embodiment of the present invention;

FIG. 5 is a partial sectional view showing how the stator and the mover are stuck;

FIGS. 9A to 9C are plan views showing how the electrostatic actuator in a moving state is subjected to a correction, wherein FIG. 9A shows a normal state of the mover before being subjected to the correction, FIG. 9B shows its state after a displacement has occurred, and FIG. 9C shows its state after the correction;

FIGS. 13A to 13C are plan views (similar to FIG. 12) showing operations of the representative electrodes in the second embodiment, wherein FIG. 13A shows a state wherein the mover has been displaced, FIG. 13B shows a state where the mover in FIG. 13B has been moved toward a moving direction, and FIG. 13C shows a state where the mover in FIG. 13B has been rightly corrected.

FIGS. 14A to 14C are plan views of the electrostatic actuator showing how the mover in the second embodiment moves, wherein FIG. 14A shows a state before the mover is subjected to a correction, FIG. 14B shows a state the mover has been displaced, and FIG. 14C shows a state after the correction;

DESCRIPTION OF THE PREFERRED EMBODIMENTS

Figure 1:
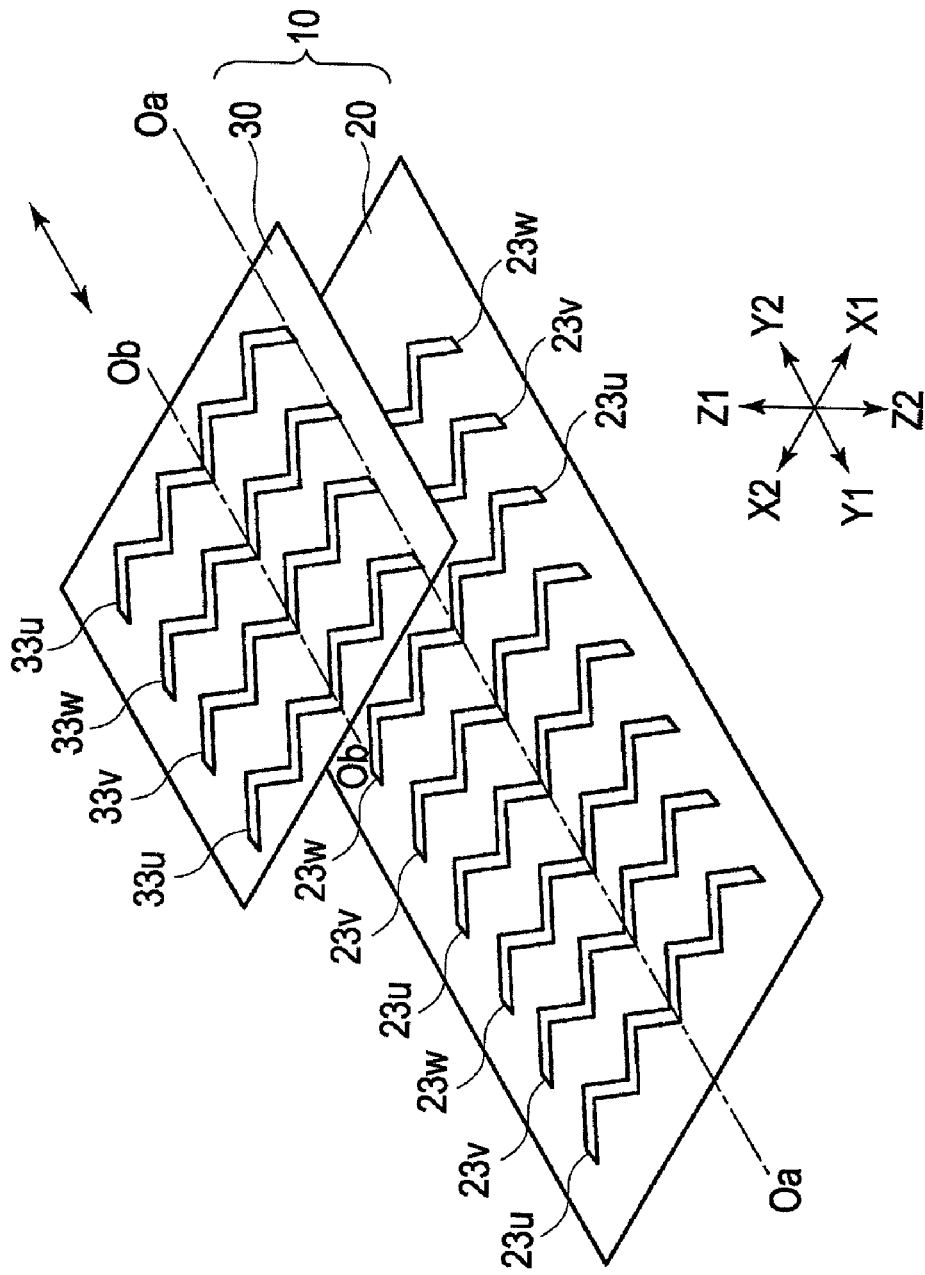
FIG. 1 is an exploded perspective view showing the outline of an electrostatic actuator according to the present invention.
Figure 2:
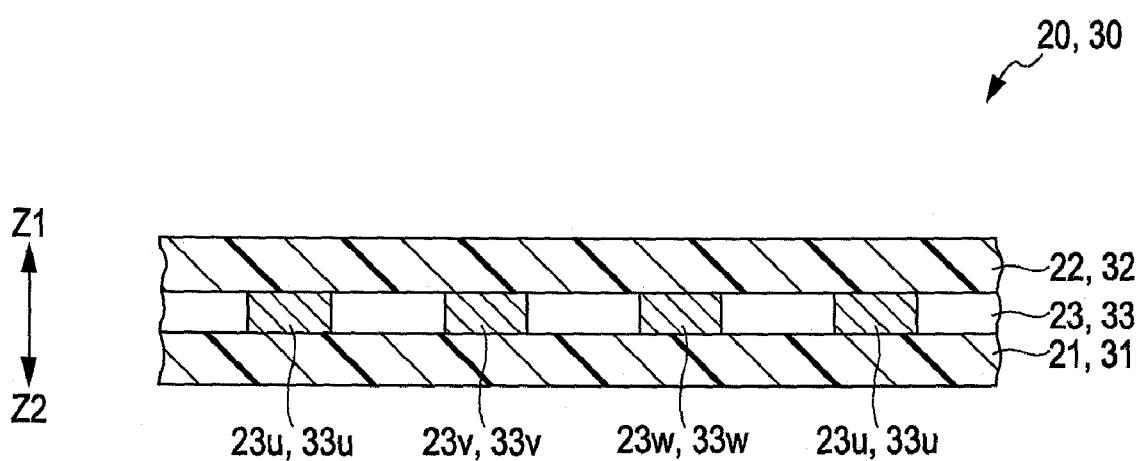
FIG. 2 is a partial sectional view showing the internal structure of a stator and a mover.
Figure 4:
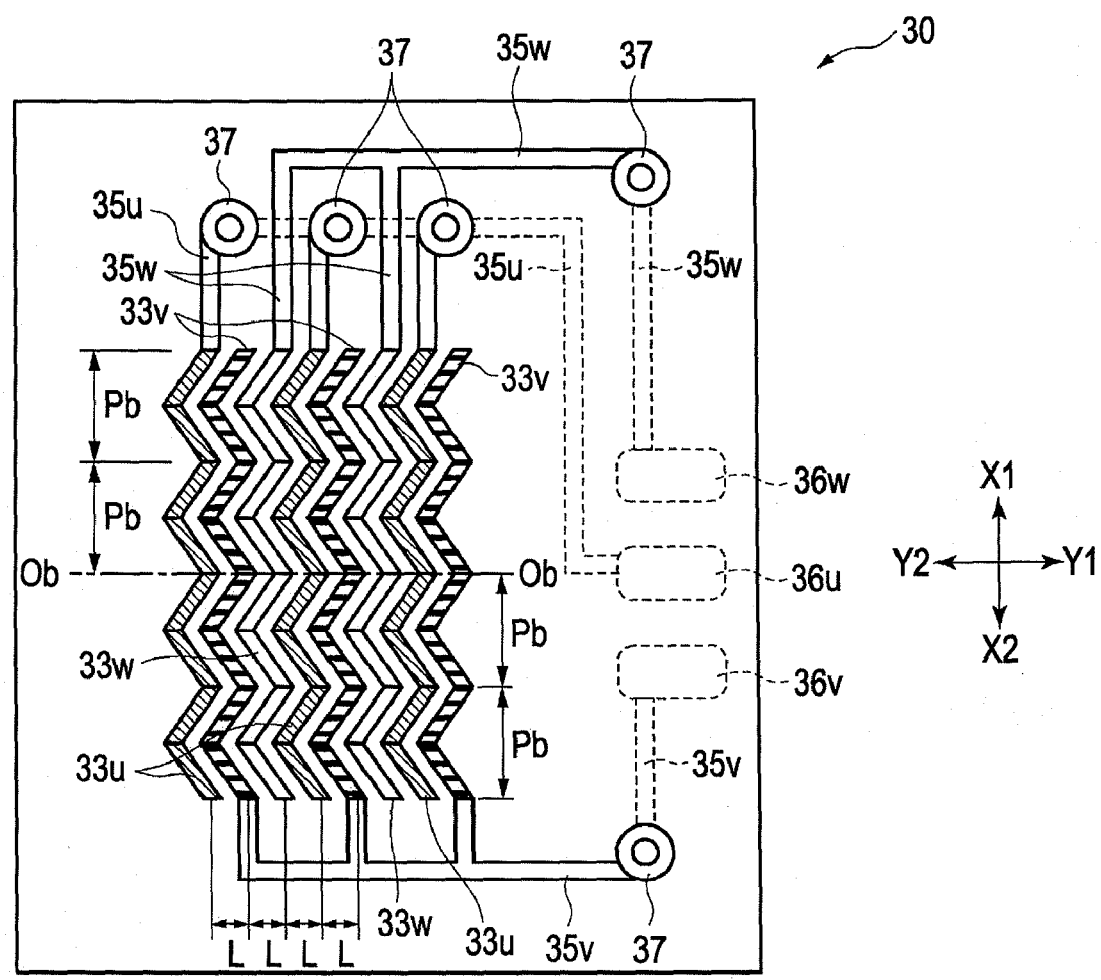
FIG. 4 is a plan view showing a configuration of a mover according to the first embodiment of the present invention.

FIG. 1 illustrates the outline of an electrostatic actuator according to the present invention; FIG. 2 illustrates the internal structure of a stator and a mover; FIG. 3 illustrates a configuration of a stator according to a first embodiment of the present invention; FIG. 4 illustrates a configuration of a mover according to the first embodiment of the present invention. FIG. 5 shows how the stator and the mover are stuck.

As shown in FIG. 1, the electrostatic actuator 10 according to an embodiment of the present invention is a parallel plate type actuator wherein a stator 20 and a mover 30 are oppositely arranged. The mover 30 is in a state of being movable in moving directions (Y1 and Y2 directions in FIG. 1), in a face-to-face relationship with the stator 20. Such an electrostatic actuator can utilize, for example, a pickup, a slider, a stage, a disk loading mechanism, an artificial muscle, as moving means.

As shown in FIG. 2, the stator 20 has a base layer 21 and a protective layer 22. Between the base layer 21 and the protective layer 22, there is provided an electrode layer 23 (including stator-side electrodes 23$u$, 23$v$, and 23$w$). The base layer 21 and the protective layer 22 are each formed into a thin film such as a thin resin film superior in insulation property and flexibility. As a material of this film, e.g., polyimide is used. The electrode layer 23 has many electrodes (conductor patterns) formed by patterning e.g., copper foil into a linear shape or a belt shape on one surface of the base layer 21.

The electrode layer 23 shown in FIG. 3 has three kinds of stator-side electrodes: 23$u$, 23$v$, and 23$w$ forming three phases (U phase, V phase, and W phase). Individual stator-side electrodes 23$u$, 23$v$, and 23$w$ extend in the widthwise direction (X direction) perpendicular to the moving direction (Y direction) as a whole, and on the way along the stator-side electrodes, there are provided mountain-and-valley shaped deformation patterns each of which is formed by alternately arranging a mountain portion and a valley portion. Although in the electrode layer 23 shown in FIG. 3, the deformation pattern are continuously arranged in the widthwise direction, the deformation pattern portion is not necessarily required to be continuous. The deformation pattern may have linear portions or the like on the way through the deformation pattern.

A plurality of the stator-side electrodes 23$u$ forming the U phase are led to a connection electrode 26$u$ provided at an edge portion in the base layer 21, by a common lead 25$u$. Likewise, a plurality of the stator-side electrodes 23$v$ and 23$w$, respectively, forming the v and w phases are led to connection electrodes 26$v$ and 26$w$, by common leads 25$v$ and 25$w$.

A portion (dotted portion) of each of the leads 25 is wired through the back surface the base layer 21 via through holes 27 formed in the base layer 21 as appropriate, because of the need to avoid electrical continuity with the other common leads 25.

The configuration of the mover 30 is the same as that of the stator 20. That is, as shown in FIG. 2, an electrode layer 33 is provided between a base layer 31 and a protective layer 32. The electrode layer 33 has mover-side electrodes 33u, 33v, and 33w forming U phase, V phase, and W phase. As shown in FIG. 4, individual mover-side electrodes 33u, 33v, and 33w have mountain-and-valley shaped or wavy shaped deformation patterns each of which is formed by alternately arranging a mountain portion and a valley portion. A plurality of the mover-side electrodes 33u, 33v, and 33w, respectively, forming the U phase, V phase, and W phase are led to connection electrodes 36u, 36v, and 36w provided at an edge portion in the base layer 31, by common leads 35u 35v, and 35w.

A portion (dotted portion) of each of the leads 35 is wired through the back surface the base layer 21 via through holes 37 formed in the base layer 21 as appropriate, because of the need to avoid electrical continuity with the other common leads 35.

Here, as shown in FIG. 3, the pitch dimension between adjacent mountain portions (ditto with that between adjacent valley portions) in the deformation patterns provided to the stator-side electrodes 23u, 23v, and 23w of the stator 20 side is assumed to be Pa. Likewise, as shown in FIG. 4, the pitch dimension as described above, in the deformation patterns provided to the mover-side electrodes 33u, 33v, and 33w of the mover 30 is assumed to be Pb. In the present embodiment, all the deformation pattern portions on the stator 20 side are formed to have the same stator pitch dimension Pa, and all the deformation pattern portions on the mover 30 side are formed to have the same mover pitch dimension Pb. In this embodiment, the stator pitch dimension Pa and the mover pitch dimension Pb are constituted of the same dimension (Pa=Pb).

In the stator 20, the average distance between the stator-side electrodes 23u and 23v adjacent to each other along the moving direction (Y direction), the average distance between the stator-side electrodes 23v and 23w, and the average distance between the stator-side electrodes 23w and 23u, are all constituted of the same pitch distance L. Likewise, in the mover 30, the average distance between the mover-side electrodes 33u and 33v adjacent to each other along the moving direction (Y direction), the average distance between the mover-side electrodes 33v and 33w, and the average distance between the mover-side electrodes 33w and 33u, are all constituted of the same pitch distance L.

Furthermore, the widthwise dimension (conductor widthwise dimension) of the stator-side electrodes 23u, 23v, and 23 in the Y direction, and the widthwise dimension (conductor widthwise dimension) of the mover-side electrodes 33u, 33v, and 33w in the Y direction, respectively, are set to one half (L/2) of the pitch distance L of the stator and the pitch distance L of the mover.

In addition, as shown in FIGS. 1 and 3, in the stator 20, the stator-side electrodes 23u, 23v, and 23w are each formed into a shape that is line-symmetric with respect to a movement center line Oa-Oa passing through the center in the widthwise direction (X direction). Likewise, as shown in FIGS. 1 and 4, in the mover 30, the mover-side electrodes 33u, 33v, and 33w are each formed into a shape that is line-symmetric with respect to a movement center line Ob-Ob passing through the center in the widthwise direction (X direction).

As shown in FIG. 5, the mover 30 is superimposed on the stator 20. In this embodiment, as a lubricant 40, e.g., minute balls made of resin are distributed or grease is supplied between the mover 30 and the stator 20. Alternatively, the lubricant may be a mixture of the minute balls and grease. The application of the lubricant 40 to the region where the mover 30 and the stator 20 are opposed to each other makes it possible to avoid direct contact between the mover 30 and the stator 20, and to reduce friction occurring therebetween. This allows the electrostatic actuator according to the present invention to drive the mover 30 by a smaller electrostatic force.

Figure 6A:
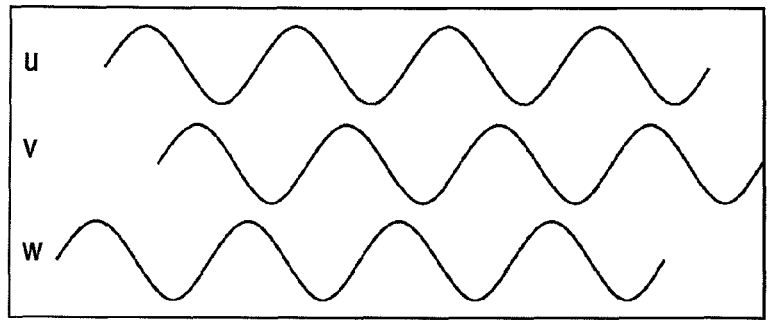
FIG. 6A is a diagram showing sine waves as an example of drive signals.
Figure 6B:
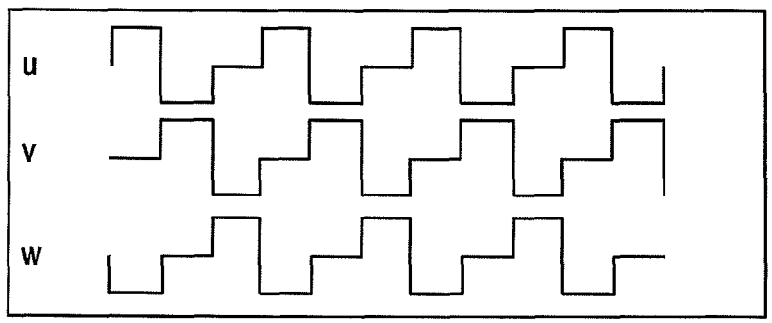
FIG. 6B is a diagram of three-phase step waves as an example of drive signals.
Figure 6C:
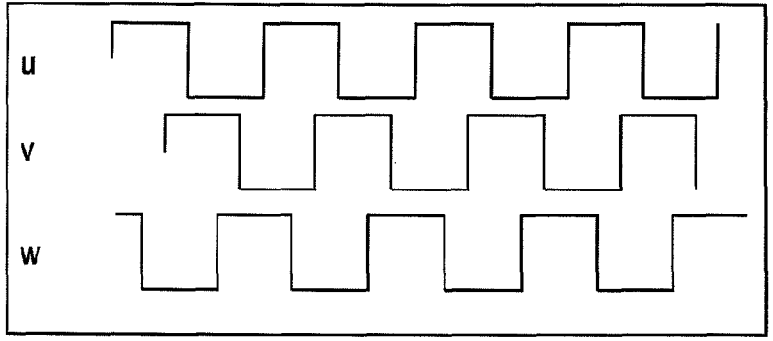
FIG. 6C is a diagram of typical three-phase step waves as an example of drive signals.
Figure 6D:
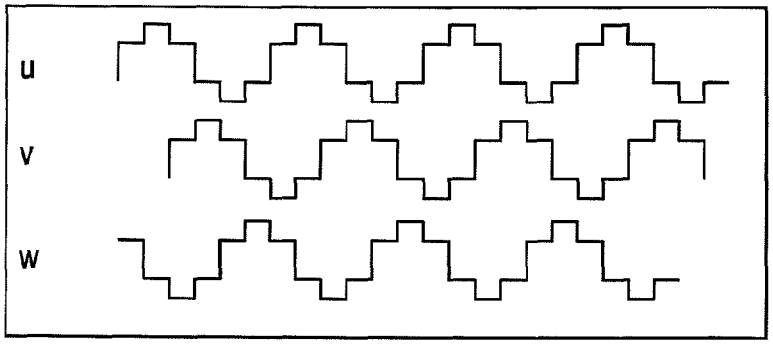
FIG. 6D is a three-phase pseudo sine waves as an example of drive signals.

FIGS. 6A to 6C are diagrams showing sine waves as examples of drive signals. As drive signals of the electrostatic actuator according to the present invention, various three-phase alternating current shaped signals, such as sine waves (FIG. 6A), step shaped three-phase step waves (FIG. 6B), typical three-phase step waves (FIG. 6C), and three-phase pseudo sine waves (FIG. 6D) can be employed.

The drive signals U, V, and W, respectively, are supplied between the stator-side electrodes 23u, 23v, and 23w of the stator 20, and the mover-side electrodes 33u, 33v, and 33w of the mover 30, from the drive signal generating portion (not shown). Here, some amount of phase difference φ is provided between drive signals U1, V1, and W1 to be supplied to the stator-side electrodes 23u, 23v, and 23w; and drive signals U2, V2, and W2 to be supplied to the mover-side electrodes 33u, 33v, and 33w.

Upon application of such drive signals U, V, and W to each electrode, a first potential distribution appears in the stator 20, and a second potential distribution appears in the mover 30 each along the moving direction (Y direction) in accordance with the phase difference φ between the drive signals (not shown). As a result, between the stator-side electrodes of the stator 20 and the mover-side electrodes of the mover 30, a thrust according to the phase difference φ between the first potential distribution and the second potential distribution occurs due to an interaction between electrostatic forces. Thereby, the mover 30 is moved to the moving direction (Y direction).

Figure 7:
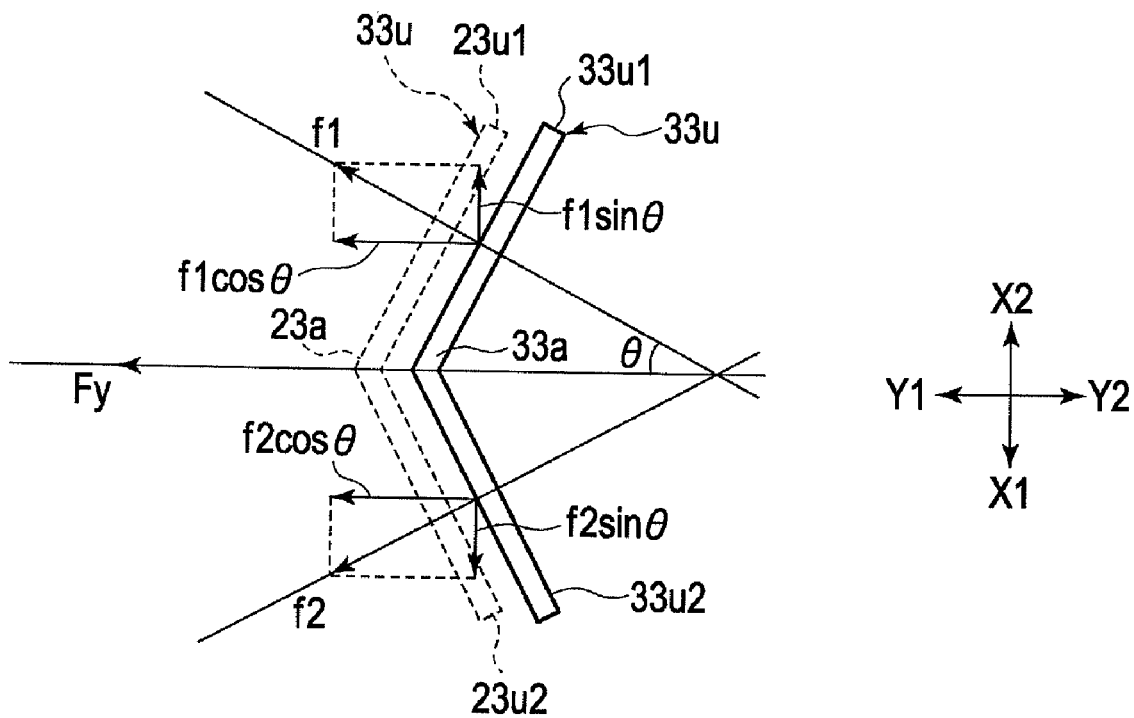
FIG. 7 is a schematic view showing thrust occurring at deformation pattern portions that electrodes have.
Figure 8A:
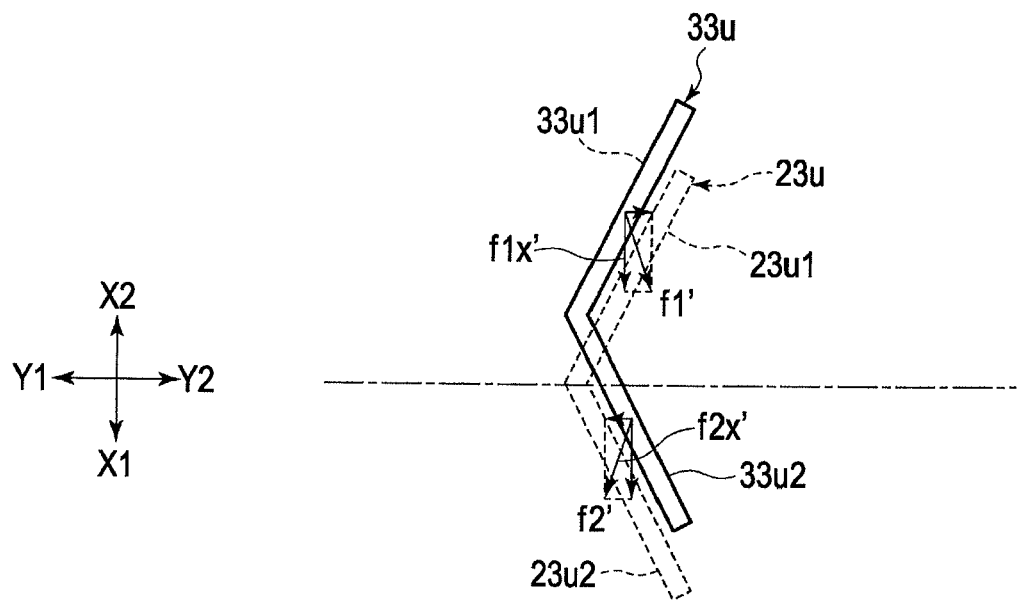
FIG. 8A is a schematic view (similar to FIG. 7) partially showing a correction operation when a displacement has occurred.
Figure 8B:
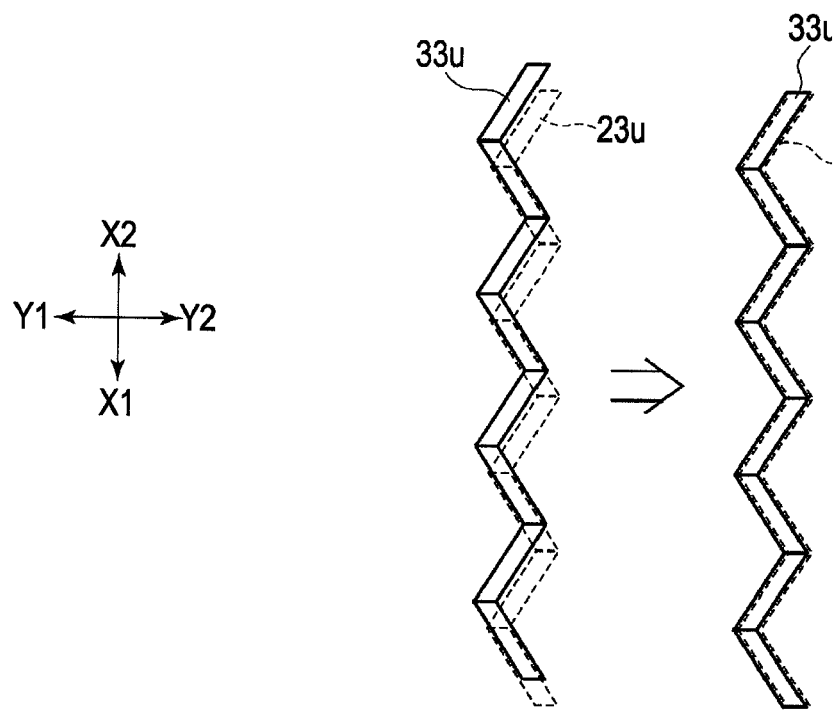
FIG. 8B is a plan view showing correction operations when the displacement has occurred, with respect to a set of electrodes in their entirety.
Figure 9A:
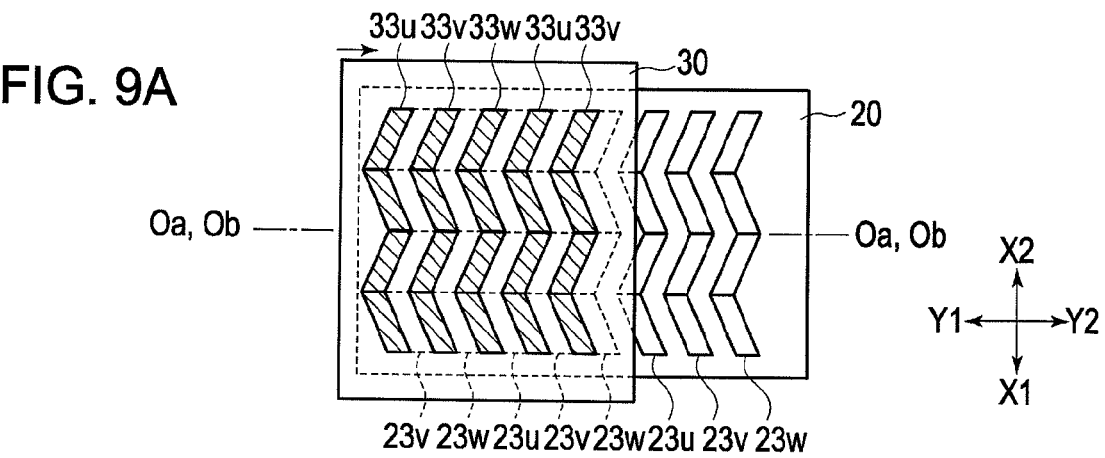
Figure 9B:
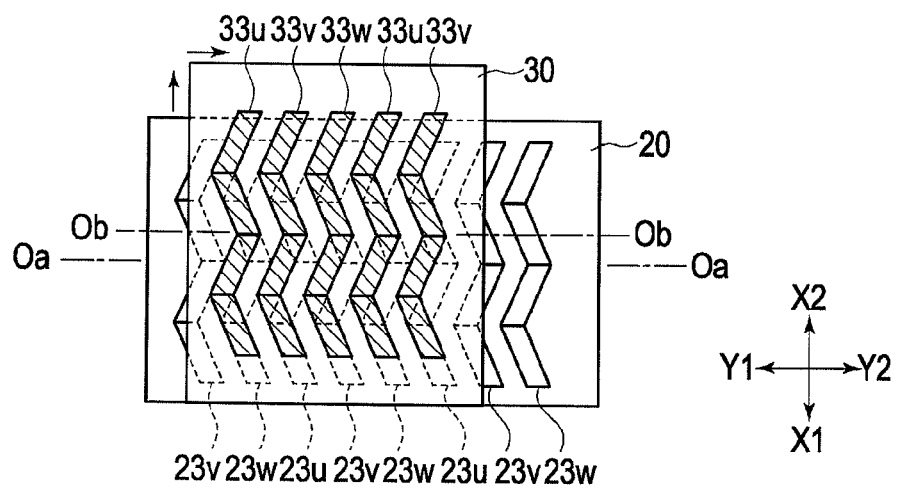
Figure 9C:
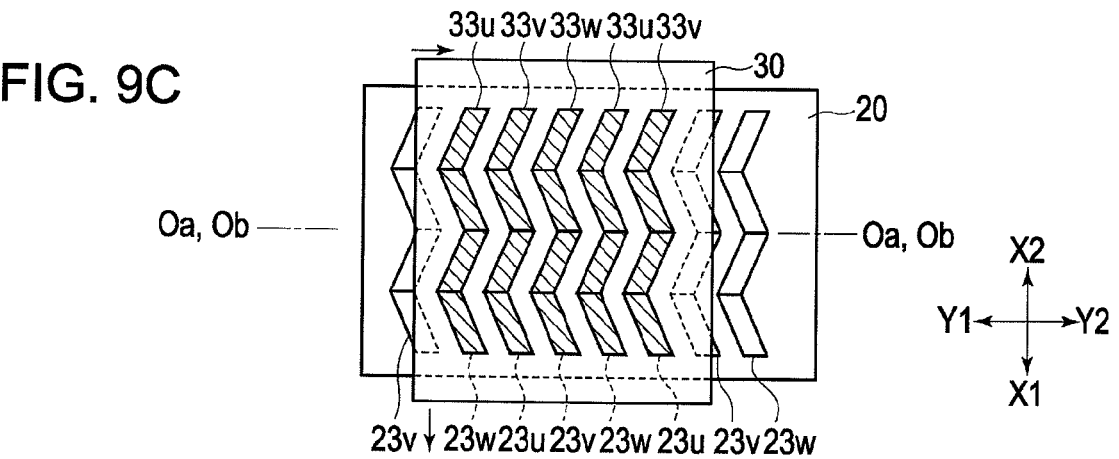

FIG. 7 is a schematic view showing thrust occurring at deformation pattern portions that electrodes have; FIG. 8A is a schematic view (similar to FIG. 7) partially showing a correction operation when a displacement has occurred; FIG. 8B is a plan view showing correction operations when the displacement has occurred, with respect to a set of electrodes in their entirety; and FIGS. 9A to 9C are plan views showing how the mover in a moving state is subjected to a correction, wherein FIG. 9A shows a normal state of the mover before being subjected to the correction, FIG. 9B shows its state after a displacement has occurred, and FIG. 9C shows its state after the correction. Here, in FIG. 7 and FIGS. 8A and 8B, as representative electrodes, the stator-side electrode 23u of the stator 20 is indicated by a dotted line while the mover-side electrode 33u of the mover 30 is indicated by a solid line.

As shown in FIG. 7, in the deformation pattern portions, a stator-side electrode 23u1 and a mover-side electrode 33u1 that are located on one side across the mountain portions 23a and 33a from a stator-side electrode 23u2 and a mover-side electrode 33u2, are in a planarly parallel relationship. Herein, an electrostatic force f1 acts between the stator-side electrodes 23u2 and the mover-side electrodes 33u2. Out of the electrostatic force f1, a component (restoring force) parallel to the X direction is $f1 \cdot \sin\theta$, and a component (thrust) parallel to the Y direction is $f1 \cdot \cos\theta$.

Likewise, an electrostatic force f2 acts between the stator-side electrode 23u2 and the mover-side electrode 33u2, which are located on the other side, as well. Out of the electrostatic force f2, a component (restoring force) parallel to the X direction is $f2 \cdot \sin\theta$, and a component (thrust) parallel to the Y direction is $f2 \cdot \cos\theta$.

If the electrostatic force f1 acting the one side and the electrostatic force f2 acting the other side are equal, that is, the forces in the X direction are in balance, the restoring force f1·sin θ and the restoring force f2·sin θ cancel each other out (Fx=f1·sin θ−f2·sin θ=0). As a consequence, a thrust Fy acting on the entirety of stator-side electrodes 23u and the mover-side electrodes 33u is expressed by:

$$Fy = f1 \cdot \cos\theta + f2 \cdot \cos\theta = (f1 + f2)\cos\theta$$
$$= 2f\cos\theta \text{ (where, } f = f1 = f2\text{)}$$

In this way, usually, the electrostatic force f1 and the electrostatic force f2 are in a balance, and the thrust Fy acts only in the moving direction (Y1 direction).

In addition, the stator-side electrodes 23u, 23v, and 23w of the stator 20, and the mover-side electrodes 33u, 33v, and 33w of the mover 30, respectively, are formed into shapes that are line-symmetric with respect to the movement center line Oa-Oa and the movement center line Ob-Ob. As a result, between the stator 20 and the mover 30, the restoring force in the X direction occurring on one side across the movement center line Oa-Oa and the restoring force in the X direction occurring on the other side across the movement center line Ob-Ob are canceled each other out, and their sum total becomes zero. It is, therefore, possible to advance the mover 30 linearly along the moving direction. That is, in electrostatic actuator according to the present invention, the mover 30 moves toward the moving direction while maintaining a state wherein its movement center line Ob-Ob substantially conforms to the movement center line Oa-Oa of the stator 20.

If some external force acts on the mover 30 and, for example, the mover 30 is moved in an illustrated X2 direction as shown in FIG. 8A, to thereby cause a displacement to the mover-side electrodes 33u, then, the following phenomenon occurs.

In a state shown in FIG. 8A, between the stator-side electrode 23u1 and the mover-side electrode 33u1, which are located on the one side, an electrostatic force f1' in a direction opposite to the above-described electrostatic force f1 in FIG. 7 acts, while, between the stator-side electrode 23u2 and the mover-side electrode 33u2, which are located on the other side, an electrostatic force f2' in a similar direction to the above-described electrostatic force f2 in FIG. 7 acts. In the electrostatic force f1' and the electrostatic force f2', their components (restoring forces) f1x' and f2x' parallel to the X direction are higher than their components (thrusts) parallel to the X direction. In addition, directions of both the component f1x' and the f2x' are the X1 direction. As a result, the restoring forces (the components f1x' and f2x') trying to return the entirety of the mover-side electrodes 33u to the X1 direction, act on the mover 30 side. Consequently, as shown in FIG. 8B, even if the entirety of moving mover-side electrodes 33u of the mover 30 are temporarily moved to the X2 direction, it is possible to return this state to a state wherein the mover-side electrodes 33u of the mover 30 and the stator-side electrodes 23u of the stator 20 are mutually superimposed.

Such restoring forces concurrently act on individual deformation patterns. Therefore, as shown in FIGS. 9A to 9C, in this electrostatic actuator 10, a displacement in the X direction in the process of the mover 30 moving toward the moving direction (Y2 direction in FIGS. 9A to 9C) can be corrected (self correction function). That is, the mover 30 is allowed to linearly move to the above-described moving direction (Y1 direction) while being restricted from movement to the X direction.

However, in the above-described embodiment, the pitch dimension Pa of the stator and the pitch dimension Pb in the X direction are the same (Pa=Pb). Accordingly, if the mover 30 is moved by an amount corresponding to an integral multiple of the pitch dimension Pa (or Pb) in the X direction, then, at a position after the movement, the deformation pattern portion of the mover 30 is superimposed on the deformation pattern portion of the stator 20. In this case, because the mover 30 can move while maintaining the state after the movement, the mover 30 cannot be returned to a normal state before the movement, that is, cannot be corrected.

This being the case, a description is made of an electrostatic actuator that, even under the above-described situation, corrects a displacement of the mover 30 in the X direction to thereby allow the mover 30 to be moved to the moving direction in a normal state.

Figure 10:
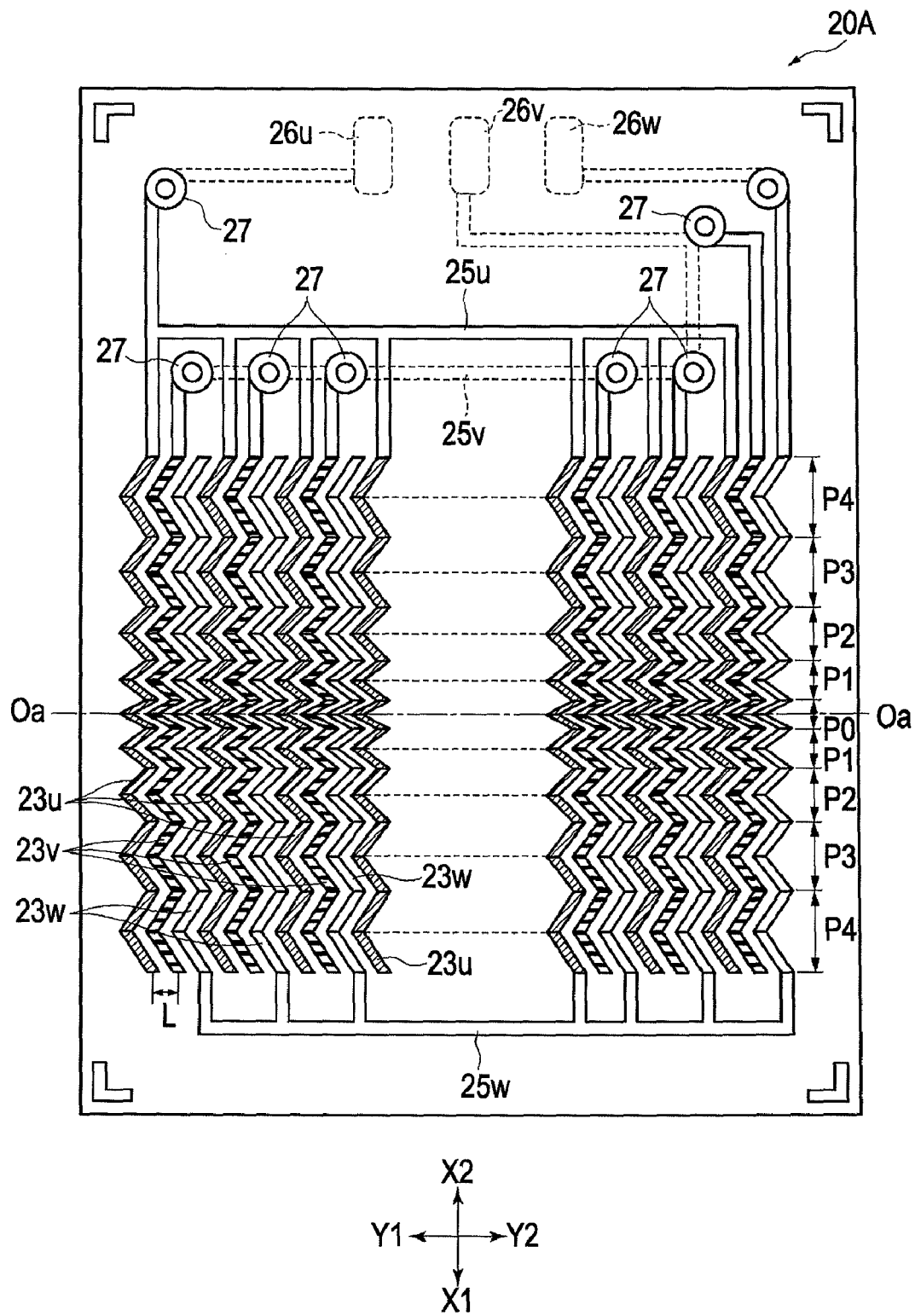
FIG. 10 is a plan view showing a configuration of a stator according to a second embodiment of the present invention.
Figure 11:
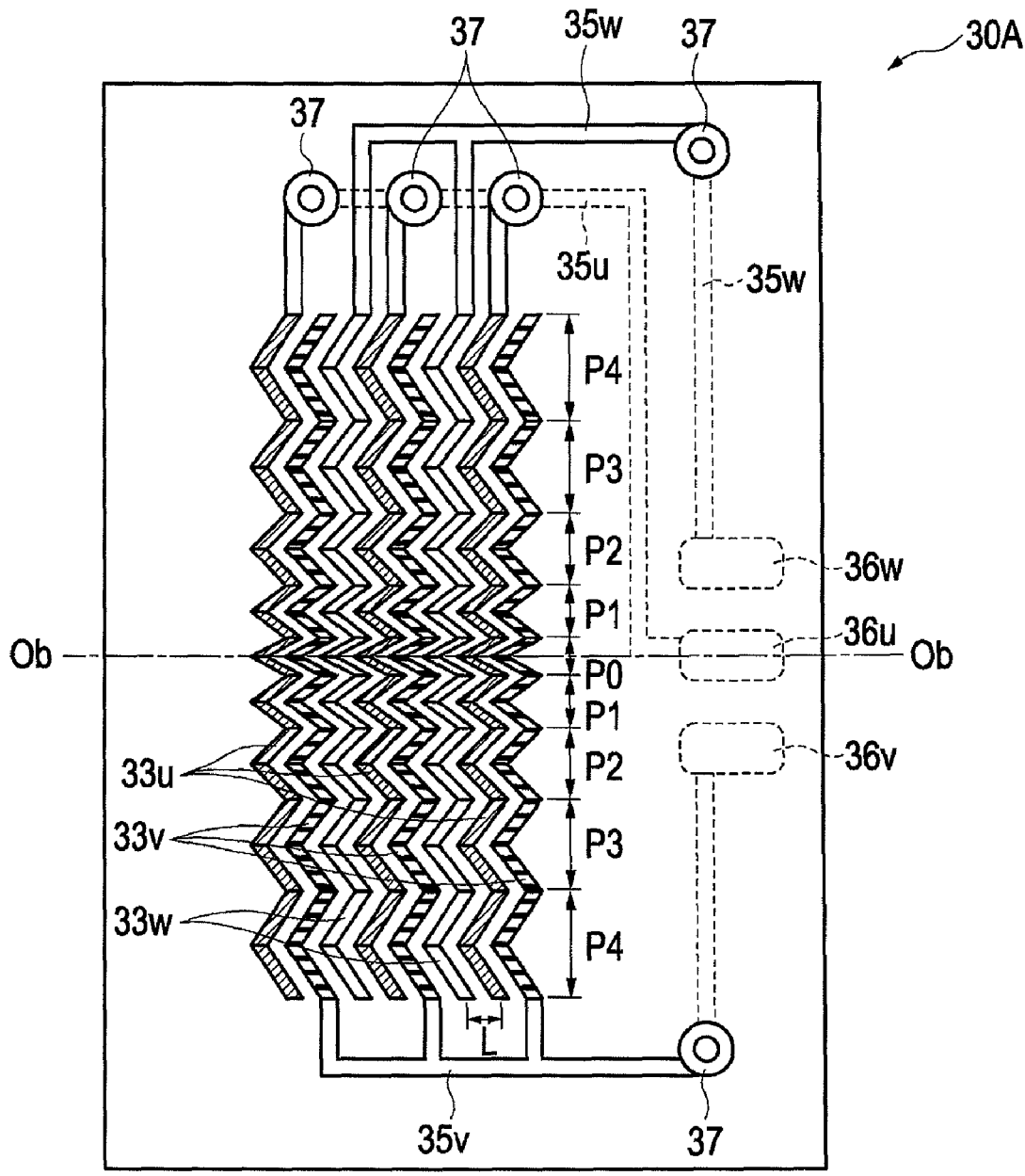
FIG. 11 is a plan view showing a configuration of a mover according to the second embodiment of the present invention.
Figure 12:
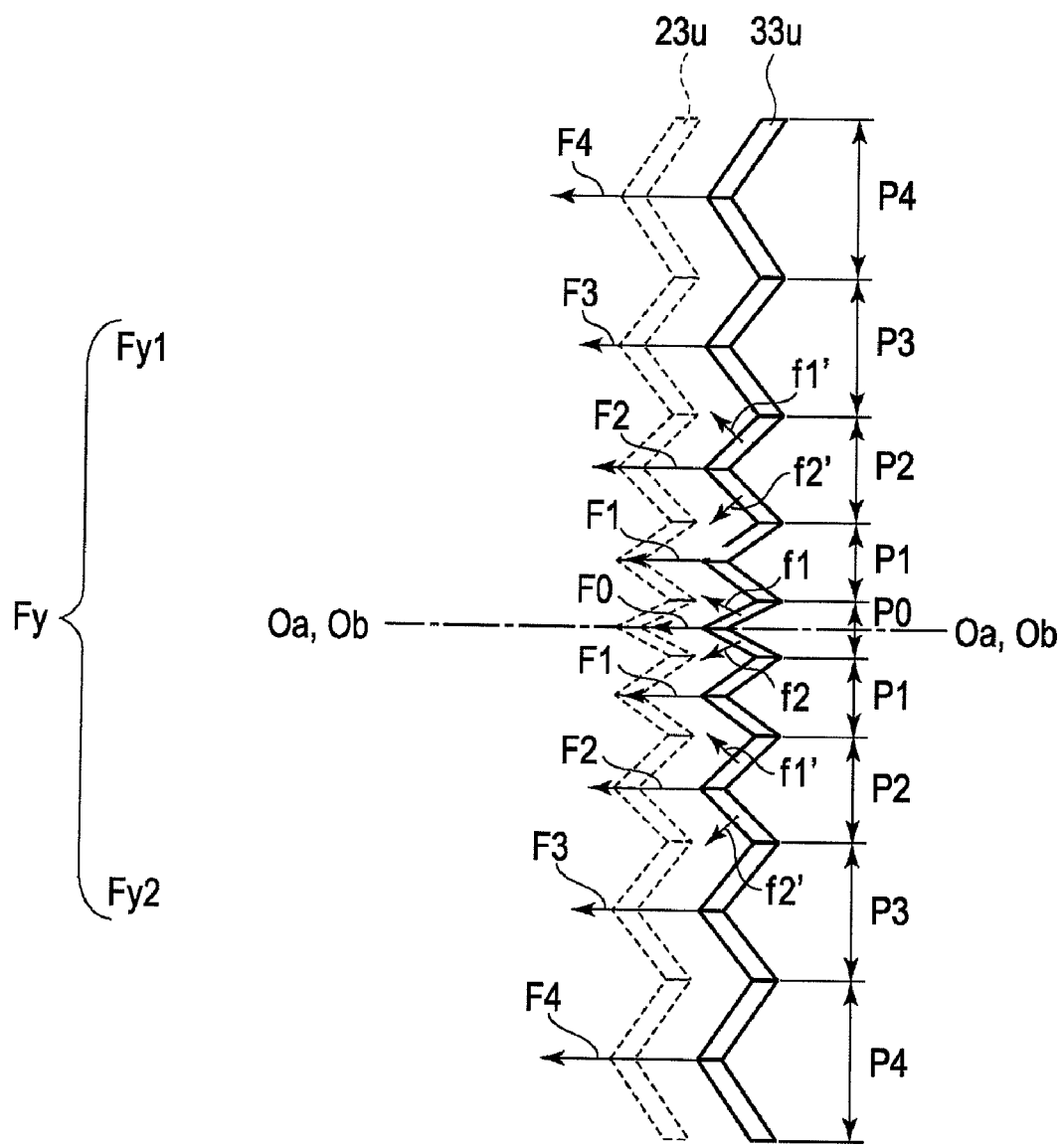
FIG. 12 is a plan view showing how electrostatic forces operate in a set of representative electrodes according to the second embodiment.

FIG. 10 is a plan view showing a configuration of a stator according to a second embodiment of the present invention; FIG. 11 is a plan view showing a configuration of a mover according to the second embodiment of the present invention; and FIG. 12 is a plan view showing how electrostatic forces operate in a set of representative electrodes according to the second embodiment.

As shown in FIG. 10, a stator 20A in the second embodiment is similar to the stator shown as the first embodiment in FIG. 3. That is, the stator 20A has three kinds of stator-side electrodes: 23u, 23v, and 23w forming three phases (U phase, V phase, and W phase). Individual stator-side electrodes 23u, 23v, and 23w extend in the widthwise direction (X direction) perpendicular to the moving direction (Y direction) as a whole, and on the way along the stator-side electrodes, there are provided mountain-and-valley shaped deformation patterns each of which is formed by alternately arranging a mountain portion and a valley portion. The stator-side electrodes 23u, 23v, and 23w, respectively, are led to a connection electrode 26u, 26v, and 26w provided at an edge portion in the base layer 21 (refer to FIG. 5) by a common lead 25u, 25v, and 25w.

In the stator 20A shown in the second embodiment, the pitch dimension P of individual stator-side electrodes 23u, 23v, and 23w is formed into a minimum dimension in the vicinity of the movement center line Oa-Oa (P=P0). The stator 20A in the second embodiment is different from the stator 20 in the first embodiment in that the pitch dimensions P of the individual stator-side electrodes 23u, 23v, and 23w are formed to gradually increase with an increase in the distance of the stator-side electrodes from the movement center line Oa-Oa in the both widthwise directions (X1 direction and X2 direction), that is, the pitch dimensions P are formed in a relationship: P0<P1<P2<P3<P4. In addition, the arrangements of the pitch dimensions P of the individual stator-side electrodes 23u, 23v, and 23w line-symmetrical with respect to the movement center line Oa-Oa. In other words, a plurality of the stator-side electrodes 23u, 23v, and 23w, respectively, forming the u phase, the v phase, and the w phase are each formed into a shape that is line-symmetric with respect to the movement center line Oa-Oa, on both sides thereacross.

On the other hand, the basic configuration of the mover 30A is the same as that of the above-described mover 30. Shapes of individual mover-side electrodes 33u, 33v, and 33w are the same as those of the stator 20A. That is, the mover 30A has a plurality of the mover-side electrodes 33u, 33v, and 33w, respectively, forming the u phase, the v phase, and the w phase. The plurality of the mover-side electrodes 33u, 33v, and 33w are each formed into a shape that is line-symmetric with respect to the movement center line Oa-Oa, on both sides thereacross.

The shapes (shape of the deformation pattern portion) of individual mover-side electrodes 33u, 33v, and 33w, respectively, are the same as the shapes of the above-described stator-side electrodes 23u, 23v, and 23w. That is, as described above, the pitch dimensions P of movers in the deformation pattern portions arranged on individual mover-side electrodes 33u, 33v, and 33w are formed to be minimum in the vicinity of the movement center line Ob-Ob, and to gradually increase with an increase in the distance of the individual mover-side electrodes from the movement center line Ob-Ob in the both widthwise directions (X1 direction and X2 direction), that is, the pitch dimensions P are formed in a relationship: P0<P1<P2<P3<P4.

In this manner, in the electrostatic actuator 10 according to the present invention, it is desirable that individual mover-side electrodes 33u, 33v, and 33w of the mover 30A, and individual stator-side electrodes 23u, 23v, and 23w of the stator 20A be formed by the same pattern shape.

The term here the "same pattern shape" means that approximate shapes in external appearance of the mover 30 and the stator 20 substantially mutually conform. For example, the case wherein the number of deformation pattern portions of wavy shape or mountain-and-valley shape conforms to each other and wherein the pitch dimensions of deformation pattern portions in the widthwise direction are somewhat mutually different but regularities regarding arrangements between deformation pattern portions and the other portions mutually conform, is in the category of the "same pattern shape". Furthermore, between the mover-side electrodes and the stator-side electrodes, somewhat difference in the widthwise dimensions (conductor widthwise dimensions) in the moving direction, of corresponding deformation pattern portions is within the category of the "same pattern shape".

The pitches between adjacent movers have only to be formed in positions line-symmetric with respect to the movement center line Ob-Ob on both sides thereacross. The pitch dimensions P are not necessarily required to have the relationship: P0<P1<P2<P3<P4. For example, the pitch dimensions P may have a relationship: P0>P1>P2>P3>P4. Alternatively, the pitch dimensions P may have a relationship: P0<P1<P2; and P2>P3>P4.

However, if the mover 30A is subjected to a displacement in the rotational direction, each electrode is significantly displaced on both the outer ends. Therefore, the case wherein, as described above, the widthwise pitch dimensions P of the deformation patterns are formed so as to be small in the vicinity of the movement center line and increase toward the widthwise both ends (that is, the case wherein P0<P1<P2<P3<P4), is preferable in terms of being able to obtain a higher restoring force, i.e., being more resistant to rotation.

The mover-side electrodes 33u, 33v, and 33w, respectively, are led to connection electrode 36u, 36v, and 36w provided at an edge portion in the base layer 31, by a common lead 35u, 35v, and 35w, and through hole 37.

The mover 30A is superimposed on the stator 20A, with the lubricant 40 as described above being applied or distributed over the stator 20A. Here, the mover 30A is superimposed on the stator 20A in such a way that the plane side of the mover 30A shown in FIG. 11 is opposed to the plane side of the stator 20A shown in FIG. 10.

Next, three-phase current shaped drive signals U, V, and W as described above, respectively, are supplied to connection electrodes 26u, 26v, and 26w of the stator 20A and the connection electrodes 36u, 36v, and 36w of the mover 30A (refer to FIGS. 6A to 6C). Thereby, predetermined voltages are applied between individual stator-side electrodes 23u, 23v, and 23w provided to the stator 20A, and individual mover-side electrodes 33u, 33v, and 33w provided in the mover 30A. Thereupon, a first potential distribution appears in the stator 20A and a second potential distribution appears in the mover 30A each along the moving direction (Y direction) while not illustrated. As a result, between the stator-side electrodes of the stator 20A and the mover-side electrodes of the mover 30A, a thrust according to the phase difference $\phi$ between the first potential distribution and the second potential distribution occurs due to an interaction between electrostatic forces. Thereby, the mover 30 is moved to the moving direction (Y direction).

In the electrostatic actuator according to the second embodiment, pitch dimensions of individual stator-side electrodes 23u, 23v, and 23w of the stator 20A and pitch dimensions of individual mover-side electrodes 33u, 33v, and 33w of the mover 30A are different from one another in the X direction (widthwise direction). As a result, as shown in FIG. 12, for example, in the stator-side electrodes 23u of the stator 20A and the mover-side electrodes 33u of the mover 30A, electrostatic forces f1 and f2 are different for each pitch in such a way that the f1 and f2 occurring in the P0, and f1' and f2' occurring in the pitch 2, respectively, are different in magnitude and direction.

However, as far as the movement center line (Ob-Ob) of the mover 30A moves on the movement center line (Oa-Oa) of the stator 20A, a component in the X-direction perpendicular to the moving direction out of the above-described electrostatic forces cancel each other out in individual pitches (f1·sin $\theta$−f2·sin $\theta$=f1'·sin $\theta$−f2'·sin $\theta$=0). Consequently, in this state, it is possible to generate only a component (thrust) substantially parallel to the moving direction, from each pitch.

Here, as shown in FIG. 12, between any stator-side electrode 23u of the stator 20A and any mover-side electrode 33u of the mover 30A, let thrusts occurring for each of the pitches P0, P1, P2, P3, and P4, respectively, be F0, F1, F2, F3, and F4. Then, between the thrusts F0, F1, F2, F3, and F4, the following relationship holds: F0<F1<F2<F3<F4. This is because the length dimensions of the stator-side electrode 23u1 and the stator-side electrodes 23u2 of the stator 20A, and the length dimensions of the mover-side electrode 33u1 and the mover-side electrodes 33u2 of the mover 30, wherein the stator-side electrode 23u1 and 23u2, and the mover-side electrodes 33u1 and 33u2 form the mountain-and-valley shaped deformation patterns, are different for each of the pitches P0, P1, P2, P3, and P4.

In this embodiment, between a set of stator-side electrodes 23u and a set of mover-side electrodes 33u, the thrust F occurring in the moving direction is expressed by $$F=F0+2\cdot(F1+F2+F3+F4).$$

Therefore, with respect to the movement center line Oa-Oa, a thrust Fy1 occurring on the illustrated X1 side and a thrust Fy2 occurring on the illustrated X2 side both become Fy1=Fy2=F0/2+(F1+F2+F3+F4). That is, in a state wherein the movement center line Oa-Oa and the movement center line Ob-Ob conform to each other, a thrust having the same magnitude and the same direction occurs between the set of stator-side electrodes 23u and the set of mover-side electrodes 33u, on both sides across the movement center line Oa-Oa (Ob-Ob).

The total thrust $\Sigma F$ of the entirety of the mover 30A is proportional to the total number n of the stator-side electrodes 23u, 23v, and 23w provided in the stator 20A, and the total thrust $\Sigma F$ is expressed by $\Sigma F=n\cdot F$. The mover 30A moves to the moving direction (Y direction) under this total thrust $\Sigma F$.

The relationship between the total thrust ΣF1 occurring on the illustrated X1 side and the total thrust ΣF2 occurring on the illustrated X2 side across the movement center line Oa-Oa (OB-OB), is ΣF1=ΣF2=n·F/2.

Next, if some external force acts on the mover 30, and the mover 30 is moved in the illustrated X1 direction to thereby cause a displacement of the mover-side electrodes 33$u$, the following phenomenon would occur.

Figure 13A:
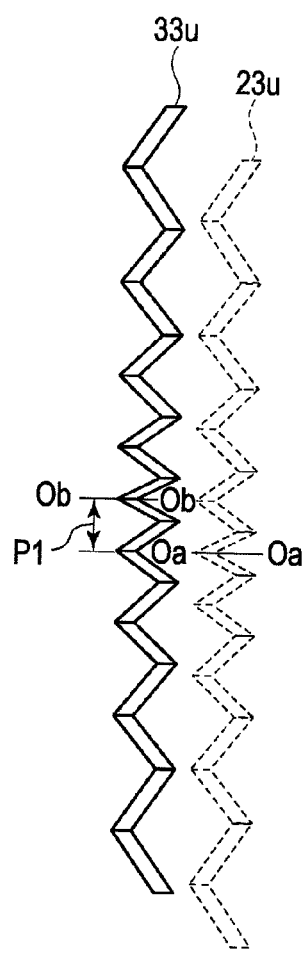
Figure 13B:
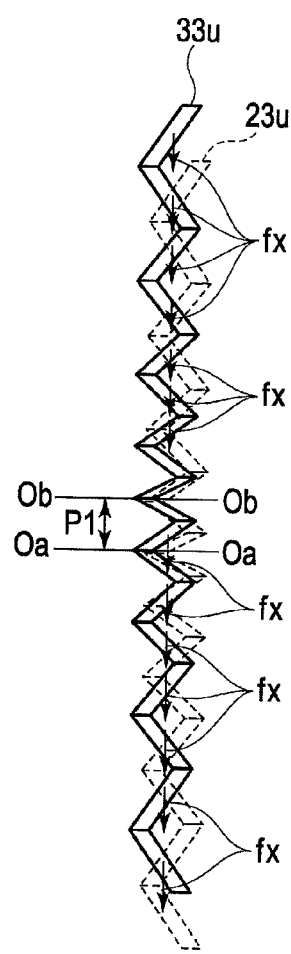
Figure 13C:
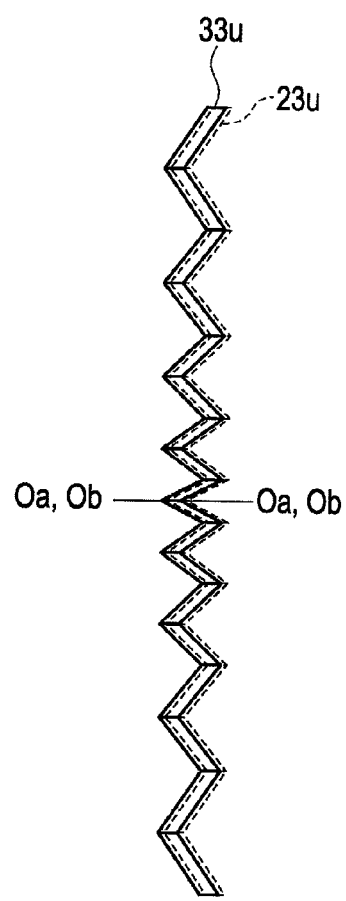
Figure 14A:
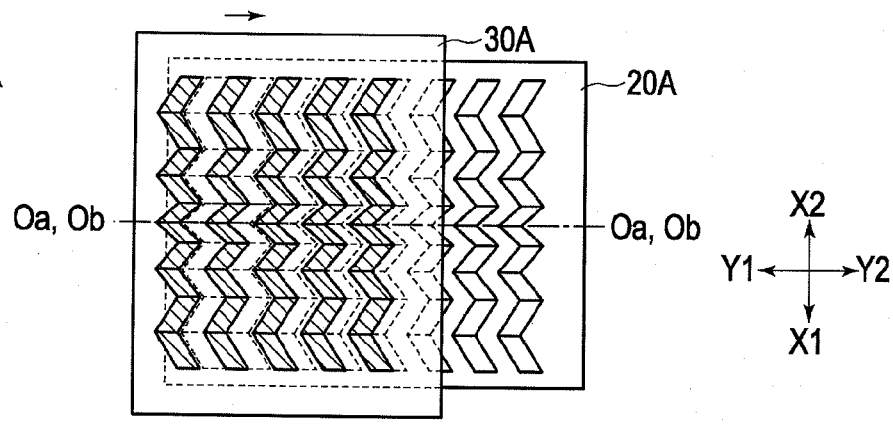
Figure 14B:
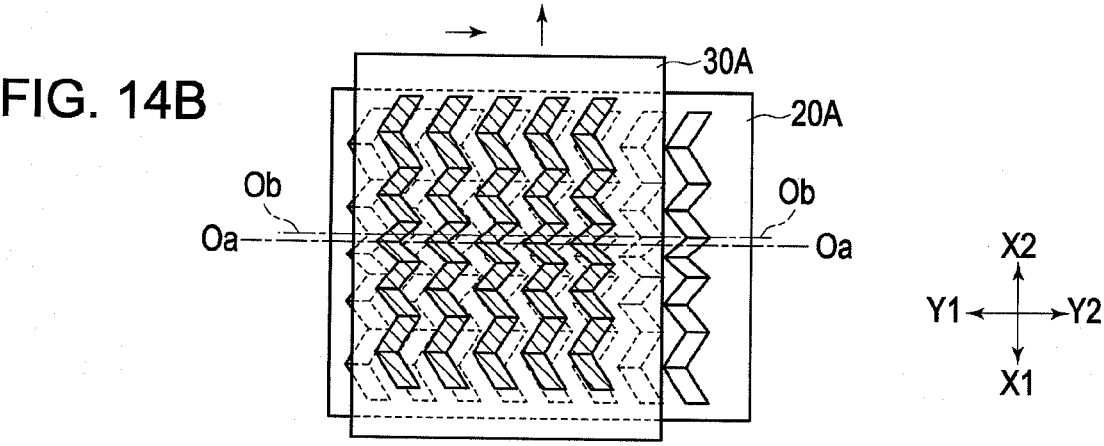
Figure 14C:
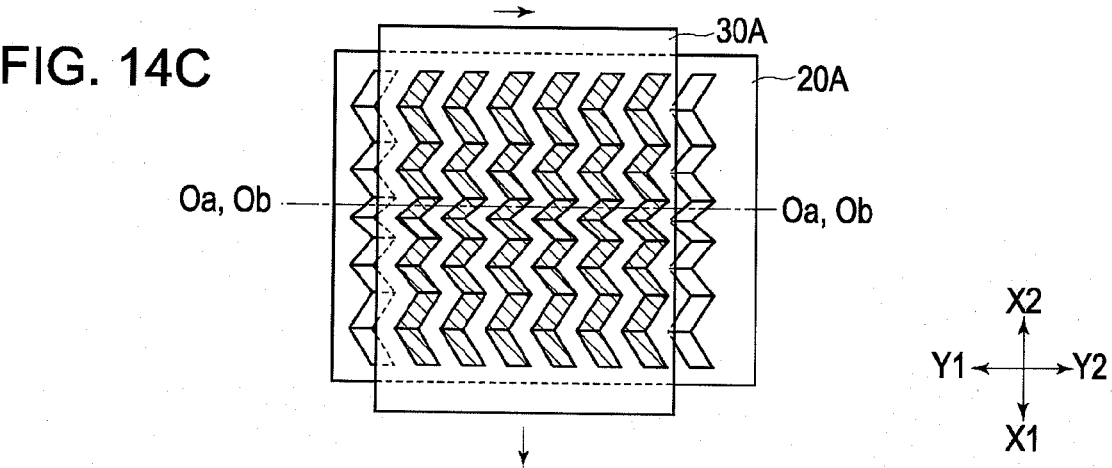
Figure 15:
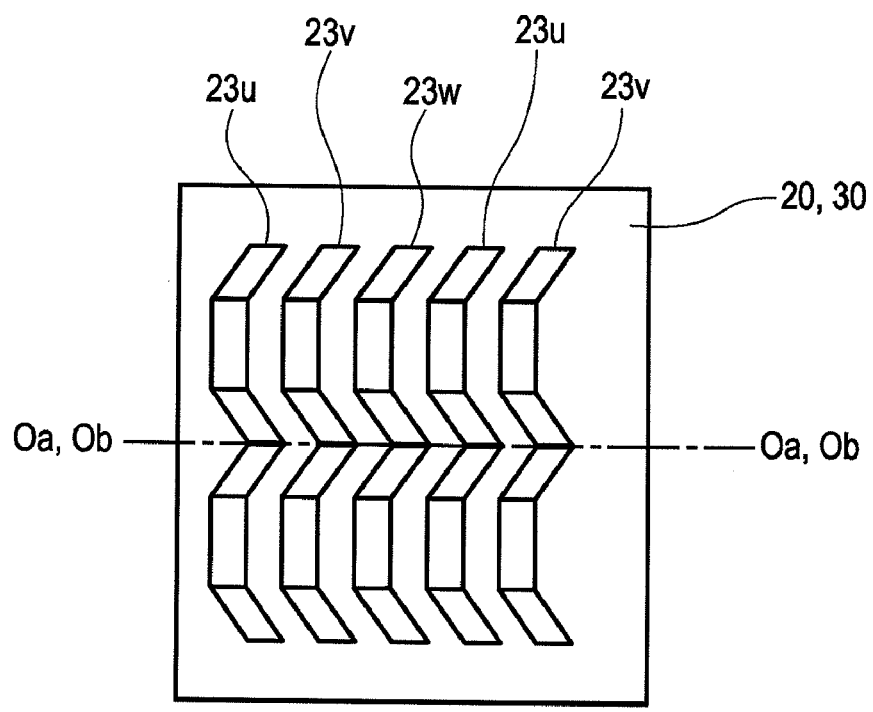
FIG. 15 is a plan view of patterns of an electrode according to another embodiment.

FIGS. 13A to 13C are plan views (similar to FIG. 12) showing operations of the representative electrodes in the second embodiment, wherein FIG. 13A shows a state wherein the mover has been displaced, FIG. 13B shows a state where the mover in FIG. 13B has been moved toward a moving direction, and FIG. 13C shows a state where the mover in FIG. 13B has been rightly corrected. Here, in FIGS. 13A to 13C, stator-side electrodes 23$u$ of the stator 20A are indicated by dotted lines while mover-side electrodes 33$u$ of the mover 30A are indicated by solid lines. FIGS. 14A to 14C are plan views of the electrostatic actuator showing how the mover in the second embodiment moves, wherein FIG. 14A shows a state before the mover is subjected to a correction, FIG. 14B shows a state the mover has been displaced, and FIG. 14C shows a state after the correction.

FIG. 13A shows a state wherein the mover-side electrodes 33$u$ of the mover 30A having subjected to some external force has been moved in the X2 direction (widthwise direction) by an amount corresponding to the pitch dimension P1. In this state, as shown in FIG. 13B, when the mover 30 is moved in the Y2 direction, the mountain portion having the movement center line Ob-Ob of the mover 30A conforms to a mountain portion that has been displaced in the X2 direction from the movement center line Oa-Oa of the stator 20A by an amount corresponding to the pitch dimension P1, and is superimposed on the pertinent mountain portion of the stator 20A. On the other hand, in the other portion, the displacement becomes progressively larger toward end portions in the widthwise direction. Consequently, in this embodiment, restoring force fx (force acting in a direction perpendicular to the direction of thrust) occurs in each of individual mover-side electrodes 33$u$1 of the mover 30A. The above-described individual restoring force fx is minimum in the vicinity of the center in the X direction (widthwise direction), and becomes higher toward the end portions in the widthwise direction. Furthermore, all the directions of the individual restoring forces fx are the X1 direction. As shown in FIG. 13C, therefore, th mover-side electrodes 33$u$ of the mover 30A can be perfectly superimposed on the stator-side electrodes 23$u$ of the stator 20A by virtue of the total ΣF1 of the individual restoring forces. That is, the mover 30A is not superimposed on the stator 20A in a state of being displaced from the stator 20A in the widthwise direction, but is superimposed thereon after the displaced state has assuredly been eliminated (self correction function). Hence, in the state after the correction, the movement center line Oa-Oa on the mover 30A side conforms to the movement center line Ob-Ob on the stator 20A side.

As shown in FIGS. 10 and 11, the plurality of stator-side electrodes 23$u$, 23$v$, and 23$w$ provided in the stator 20A and the plurality of mover-side electrodes 33$u$, 33$v$, and 33$w$ provided in the mover 30A are all formed into the same patterns. Therefore, by providing the three-phase alternating current shaped predetermined drive signals to electrodes, even in the event that some force acts on the mover 30A in the widthwise direction perpendicular to the moving direction, and the mover 30A is temporarily displaced as shown in FIG. 14C, it is possible to correct the displacement in the course of its movement to thereby straight advance the mover 30A along the moving direction.

In addition, the plurality of stator-side electrodes 23$u$, 23$v$, and 23$w$ and the plurality of mover-side electrodes 33$u$, 33$v$, and 33$w$ are equal in the pitch distance L in the moving direction. This allows the mover 30A during moving to be prevented from repeated occurrences of rapid acceleration or rapid deceleration, thus enabling a mover that is less prone to be displaced to be provided.

In the second embodiment, the pitch dimensions in the X direction (widthwise direction), of the individual stator-side electrodes 23$u$, 23$v$, and 23$w$ of the stator 20A and those of the individual mover-side electrodes 33$u$, 33$v$, and 33$w$ of the mover 30A are mutually different. Accordingly, even if the mover 30 is moved by a moving amount corresponding to any of the pitch dimension P0, P1, P2, P3, and P4 in the X direction, or by a moving amount corresponding to an integral multiple thereof, the deformation pattern portion of the stator 20A and that of the mover 30A do not superimpose on each other at a position after the movement and are not held there. Therefore, the displaced mover 30A can be assuredly returned to the normal state.

In the above-described embodiments, the case wherein the pattern shapes of electrodes are mainly formed into the mountain-and-valley shape has been described. However, the present invention is not limited this shape. Pattern shapes of electrodes may include a deformation pattern portion constituted of, e.g., a trapezoidal wave shape or a sine wave shape.

Regarding the pitch distance L in the moving direction between electrodes arranged side by side in the moving direction, the case wherein the pitch dimension L is the same as the widthwise dimension of electrode (conductor width dimension) has been described, but the present invention is not limited thereto. The pitch distance different from the widthwise dimension of electrode may be adopted. Also, the case wherein all pitch distances L are equal has been described, but, for example, an arrangement which has mutually different pitch distances L1, L2, . . . , and in which these pitch distances are regularly arranged along the moving direction (i.e., unequal pitches), may be employed.

Moreover, in the above-described embodiments, the case wherein the mover 30 moves on the stator 20 horizontally arranged, while maintaining a horizontal posture has been described, but the present invention is not limited thereto. An arrangement wherein the mover 30 moves on the stator 20 obliquely arranged, while maintaining an oblique posture, may be used. In this case, it is preferable that the widthwise length dimension of the stator-side electrode 23$u$1 located on one side of the stator-side electrode 23$u$ across the mountain portions 23$a$ be made different from that of the stator-side electrode 23$u$2 located on the other side thereacross. For example, by forming the pattern shape of the electrodes of at least one of the mover and the stator into a shape with non-isoclinal oblique lines such as saw teeth, it is possible to straight advance the mover 30 on the stator 20 arranged obliquely, along the movement center line thereof. Here, shapes of individual stator-side electrodes 23$u$, 23$v$, and 23$w$ of the stator 20A and those of individual mover-side electrodes 33$u$, 33$v$, and 33$w$ of the mover 30A are not required to be line-symmetric with respect to the movement center line Oa-Oa and Ob-Ob, respectively.

Figure 16:
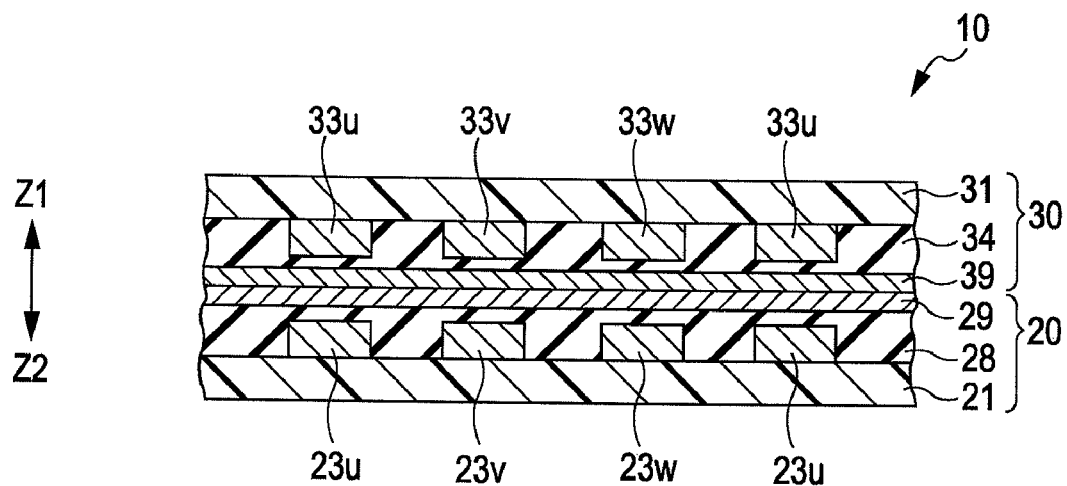
FIG. 16 is a partial sectional view showing a stack configuration composed of a stator and mover in another embodiment.

Furthermore, the configurations of the stator 20 and the mover 30 in the electrostatic actuator according to the present invention are not restricted to the configuration shown in FIG. 2. For example, the configuration as shown in FIG. 16 may be used. In the electrostatic actuator shown in FIG. 16, the stator 20 has a configuration wherein a plurality of stator-side electrodes 23*u*, 23*v*, and 23*w* are formed on the surface of the base film (base layer) 21 made of polyimide, and wherein the plurality of stator-side electrodes 23*u*, 23*v*, and 23*w* are covered with an insulating layer 28, and further the surface is coated with DLC (diamond like carbon) film 29. The mover 30 has also a base layer 31, a plurality of mover-side electrodes 33*u*, 33*v*, and 33*w*, an insulating layer 38, and DLC film 39 that have similar constitutions to those of the stator 20.

In a state wherein the DLC film 39 on the mover 30 side face to the DLC film 29 on the stator 20 side, the mover 30 is arranged on the stator 20. In this electrostatic actuator, which is configured so that the DLC films 29 and 39 of the stator 20 and the mover 30 make contact with each other, the DLC films 29 and 39 have a very high smoothness and a low friction coefficient. This allows the mover 30 to smoothly move on the stator 20.

In the above-described embodiments, both of the stator 20 and the mover 30 have been described as being formed into a sheet shape, but the present invention is not limited thereto. That is, considering the controllability of the mover 30 such as its quick responsiveness, and its lower power consumption, it is preferable that at least the mover 30 be formed in a sheet shape.

What is claimed is:

1. An electrostatic actuator comprising:
   a stator having a plurality of stator-side electrodes;
   a mover having a plurality of mover-side electrodes; and
   a drive signal generating portion supplying predetermined drive signals between the stator-side electrodes and the mover-side electrodes,
   wherein the mover is moved toward a predetermined moving direction in a state of being opposed to the stator;
   wherein, when a direction perpendicular to the moving direction is defined to be a widthwise direction, the stator-side electrodes and the mover-side electrodes are formed into a linear pattern or a band shaped pattern along the widthwise direction; and both the stator-side electrodes and the mover-side electrodes have deformation patterns of a wavy shape or a mountain-and-valley shape at least in their portions;
   wherein in the stator-side electrodes and the mover-side electrodes, the deformation patterns are provided at a plurality of places along the widthwise direction; and a pitch dimension between deformation patterns mutually adjacent in the widthwise direction is formed larger at places away from a center line on the stator side and a center line on the mover side than at places nearer the center lines; and
   wherein the stator-side electrodes and the mover-side electrodes are formed into the same pattern shape.

2. The electrostatic actuator according to claim 1, wherein, when an imaginary straight line extending toward the moving direction through a widthwise center of the stator is assumed to be a center line on the stator side, and an imaginary straight line extending toward the moving direction through a widthwise center of the mover is assumed to be a center line on the mover side, the stator-side electrodes are formed into shapes that are line-symmetric with respect to the center line on the stator side, and the mover-side electrodes are formed into shapes that are line-symmetric with respect to the center line on the mover side.

3. The electrostatic actuator according to claim 1, wherein the stator-side electrodes and the mover-side electrodes are both configured so that electrodes adjacent to each other along the moving direction are formed into the same pattern shape.

4. The electrostatic actuator according to claim 1, wherein at least the mover is formed into a thin sheet shape.

5. The electrostatic actuator according to claim 1, wherein drive signals having a three-phase alternating current shape are supplied between the stator-side electrodes and the mover-side electrodes, from the drive signal generating portion.

* * * * *